Nov. 29, 1938. O. SVENSON 2,138,310

PRESSURE RESPONSIVE RESISTANCE DEVICE

Filed June 3, 1936

INVENTOR
Ogden Svenson
By Ralph Burch
ATTORNEY

Patented Nov. 29, 1938

2,138,310

UNITED STATES PATENT OFFICE 2,138,310

PRESSURE RESPONSIVE RESISTANCE DEVICE

Ogden Svenson, Strathclair, Manitoba, Canada

Application June 3, 1936, Serial No. 83,361
In Canada June 4, 1935

1 Claim. (Cl. 201—50)

This invention relates to new and useful improvements in a pressure responsive resistance device. Its primary object is to devise and construct means to determine at all times the amount of air pressure in a pneumatic tire and is particularly adaptable to automobile tires.

A further object of the invention is to devise electrical means to determine the air pressure of a pneumatic tire, said means including an ammeter to register the current passing through a circuit.

A still further object of the invention is to construct such a device that may be partially arranged on the dash of an automobile so that the state of tires may be known at all times by the driver.

With these and other objects in view that may appear while the description proceeds the invention consists in the novel construction and arrangement of parts as hereinafter more specifically set forth, claimed and shown in the accompanying drawing forming part of this application and in which:—

Figure 1:
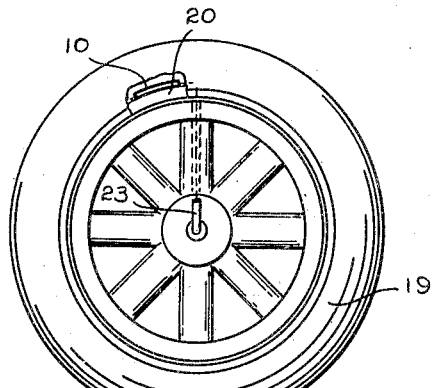
Fig. 1 is an elevational view of an automobile wheel showing the general location of the pressure device on the rim.
Figure 2:
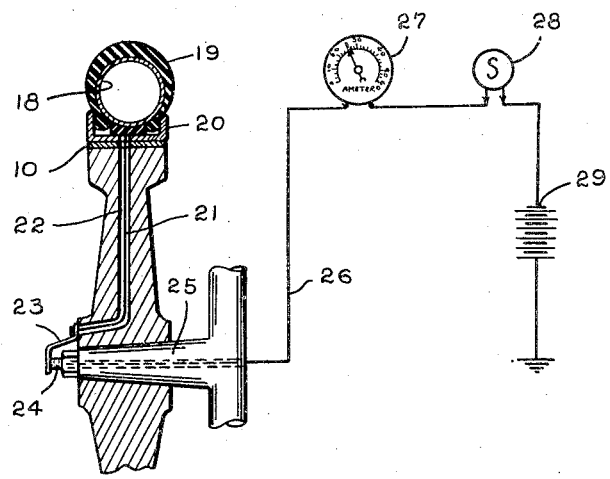
Fig. 2 is a partial sectional view of a wheel and mounting therefor showing the electrical wiring diagram.
Figures 3, 4:
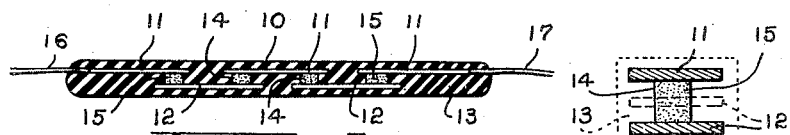
Fig. 3 is a sectional view of the pressure device.
Fig. 4 is an enlarged sectional view on the line 4—4 of Fig. 3.

Referring more in detail to the drawing in which similar reference characters designate corresponding parts throughout the several parts it will be seen the invention comprises a pressure device generally denoted as 10 and consisting of a plurality of metal strips 11 placed end to end in spaced apart relation to and insulated from each other. A second plurality of metal strips 12, likewise placed end to end, spaced apart and insulated from each other are positioned parallel to the metal strips 11 in spaced apart relation thereto and partially insulated therefrom. The second strips 12 are so arranged that they will overlap the intervening space between the strips 11 and likewise the strips 11 overlap the space between the strips 12. The insulation forms the body 13 of the device and retains the various members in their relative positions. The said insulation is preferably formed from a high grade rubber which may be compressed in a manner to cause the layers of metal strips 11 and 12 which are moulded therein to be brought closer together and to separate when the pressure is released. Between the metal strips 11 and 12 are apertures 14 formed in the body 13. Said apertures extend clear from metal to metal and are filled with substance such as graphite 15 which is a high resistance conductor of electricity. Referring more particularly to Fig. 4, it will be seen that when the plates are brought closer together as shown in the dotted lines the distance therebetween is reduced and therefore, the path of an electric current passing from one to the other via the resistance element 15, is shortened. It follows that since the resistance is shortened a greater flow of electricity will be permitted to pass therethrough. The assembled pressure device constitutes a multiple arrangement of the foregoing units having wire connections 16 and 17 soldered to the opposite ends thereof.

The device is designed to be associated with the tube 18 and the tire 19, and is positioned between the same and the rim 20 in a manner to be actuated thereby when the tube is inflated. The wire 16 is soldered to the rim 20, and grounded to the frame of the vehicle and the wire 17 connected to a lead 21 which extends through a hollow spoke 22 to a brush connection 23. Said connection 23 being in contact with an insulated rod or bolt 24 extending through the axle 25. A connecting wire 26 extends therefrom to an ammeter 27 and from thence to the switch 28 and the battery circuit 29. The ammeter may be arranged if so desired to read with figures to correspond to pounds pressure to denote the pressure in the tire to which the device is connected and may be adapted for including in the dash board layout.

When the pressure in the tire is low the metal strips 11 and 12 are at their maximum distance apart and therefore, the resistance in the electrical circuit is likewise at its maximum and the flow therethrough when the switch is closed is recorded by the ammeter. As the tire is inflated the metal strips 11 and 12 are brought closer together and the resistance consequently reduced and registered on the ammeter as previously explained. It will therefore be seen that we have devised an electrically operated tire pressure gauge which may be mounted on the dash for the convenience of the driver and may be read at all times by the operation of the switch.

It is believed that the construction and advantages of the structure shown will be apparent from the foregoing paragraphs taken in conjunction with the accompanying drawing without further detailed description.

While the preferred embodiment of the invention has been disclosed it is understood that minor changes in the details of construction, combination and arrangement of co-operating elements may be resorted to within the scope of what is claimed without departing from the spirit of the invention.

I claim:—

In a circuit controlling device a compressible base of non-conducting material, a series of contact members embedded in said base in longitudinal alinement with their ends in spaced apart relation, a second series of contact members embedded in said base in spaced parallel relation to said first series of contact members being movable towards and from the first series of contact members and having their ends in spaced apart relation, the individual members of one series of contact members being arranged to overlap the ends of the other series of contact members and the intervening space therebetween, and granular conducting material positioned between the two series of contact members adapted to be compressed by the movement of said base and to engage said contact members.

OGDEN SVENSON.